United States Patent [19]

Hendry et al.

[11] Patent Number: 4,824,732
[45] Date of Patent: Apr. 25, 1989

[54] PROCESS AND APPARATUS FOR INJECTION MOULDING AND MOULDINGS PRODUCED THEREBY

[75] Inventors: James W. Hendry, Spring Hill, Fla.; Geoffery D. Cahan, Little Kingshill, England

[73] Assignee: Cinpres Limited, Staffordshire, England

[21] Appl. No.: 857,015

[22] Filed: Apr. 29, 1986

Related U.S. Application Data

[63] Continuation-in-part of Ser. No. 607,560, May 7, 1984, abandoned.

[30] Foreign Application Priority Data

May 11, 1983 [GB] United Kingdom ............... 8312933

[51] Int. Cl.$^4$ .................. B32B 3/26; B29C 67/20; B29C 49/00; C08J 9/34
[52] U.S. Cl. .................. 428/542.8; 264/45.5; 264/50; 264/54; 264/500; 264/328.12; 264/DIG. 83; 425/4 R; 425/522; 425/546; 425/817 R; 521/51
[58] Field of Search ............... 264/50, 500, DIG. 83, 264/45.1, 45.5, 328.12; 425/4 R, 522, 546, 817 R; 428/542.8

[56] References Cited

U.S. PATENT DOCUMENTS

| Re. 23,176 | 11/1949 | Milner . | |
| 2,331,688 | 10/1943 | Hobson . | |
| 2,345,144 | 3/1944 | Opavsky | 264/572 X |
| 2,848,879 | 8/1958 | Hesson | 62/54 |
| 2,960,272 | 11/1960 | Saunders | 237/8 |
| 3,065,501 | 11/1962 | Gasmire | 425/147 |
| 3,082,484 | 3/1963 | Sherman | 425/4 C |
| 3,114,931 | 12/1963 | Pelikan | 425/4 C |
| 3,135,640 | 6/1964 | Kepka et al. | 264/572 X |
| 3,254,496 | 4/1963 | Roche et al. | 62/15 |
| 3,268,636 | 8/1966 | Angell, Jr. | 264/51 |
| 3,288,898 | 11/1966 | West | 264/523 X |
| 3,319,434 | 5/1967 | Matesanz | 62/45 |
| 3,378,612 | 4/1968 | Dietz | 264/46.6 |
| 3,562,368 | 2/1971 | Bridgeford | 264/36 |
| 3,649,728 | 3/1972 | Honsho et al. | 264/40 |
| 3,717,162 | 2/1973 | Prescott | 137/14 |
| 3,806,291 | 4/1974 | Hendrey | 425/147 |
| 3,848,036 | 11/1974 | Sleefluth | 264/40 |
| 3,873,661 | 3/1975 | Kontz | 264/98 |
| 3,879,155 | 4/1975 | Hendry | 425/4 C |
| 3,966,372 | 6/1976 | Yasuike et al. | 425/4 R |
| 3,989,436 | 11/1976 | McNeely et al. | 425/242 R |
| 4,019,524 | 4/1977 | Whitson et al. | 137/14 |
| 4,032,337 | 6/1977 | Boyer | 425/405 H |
| 4,033,710 | 7/1977 | Hanning | 425/543 |
| 4,043,715 | 8/1977 | Hendry | 264/50 X |
| 4,067,673 | 1/1978 | Hendry | 425/4 R |
| 4,070,429 | 1/1978 | Uhlig | 264/98 |
| 4,101,617 | 7/1978 | Friederich | 264/572 |
| 4,106,887 | 8/1978 | Yasuike et al. | 425/549 |
| 4,120,924 | 10/1978 | Rainville | 264/45.5 |
| 4,129,635 | 12/1978 | Yasuike et al. | 264/529 X |
| 4,136,220 | 1/1979 | Olabisi | 264/504 X |
| 4,140,672 | 2/1979 | Kataoka | 264/45.1 |
| 4,155,969 | 5/1979 | Hendry | 264/45.1 |
| 4,201,742 | 5/1980 | Hendry | 264/45.5 |
| 4,234,642 | 11/1980 | Olabisi | 264/572 X |
| 4,247,515 | 1/1981 | Olabisi | 264/500 |
| 4,255,368 | 3/1981 | Olabisi | 264/45.5 |
| 4,333,608 | 6/1982 | Hendry | 239/118 |
| 4,389,358 | 6/1983 | Hendry | 264/40.4 X |
| 4,389,367 | 6/1983 | Hudson | 264/570 |
| 4,390,332 | 6/1983 | Hendry | 264/40.4 X |
| 4,390,486 | 6/1983 | Hendry et al. | 264/455 |
| 4,459,331 | 7/1984 | Brix et al. | 428/71 |
| 4,474,717 | 10/1984 | Hendry | 264/50 X |
| 4,487,025 | 12/1984 | Hamid | 62/54 |
| 4,498,860 | 2/1985 | Gahan | 425/562 |
| 4,555,225 | 11/1985 | Hendry | 425/127 X |

FOREIGN PATENT DOCUMENTS

| 2106546 | 8/1972 | Fed. Rep. of Germany ... 264/DIG. 83 |
| 2256021 | 12/1974 | France . |
| 53-25352 | 3/1978 | Japan . |
| 54-15291 | 2/1979 | Japan . |

(List continued on next page.)

OTHER PUBLICATIONS

Gross, L. H. and R. G. Angell, "Swirl-Free Foam Parts", in *Plastics Technology*, May 1976, pp. 33–36.

(List continued on next page.)

Primary Examiner—Philip Anderson
Attorney, Agent, or Firm—Beveridge, DeGrandi & Weilacher

[57] ABSTRACT

The invention provides a process and apparatus for producing an injection moulding of plastics material. The process comprises introducing the plastics material in the form of a molten stream into a mould space, measuring a quantity of a non-plastics fluid by filling a chamber with the fluid and holding the fluid in the chamber under pressure, said measured quantity being sufficient to achieve an intended weight reduction in the resultant injection moulding and to create a required internal pressure in the moulding to be formed, injecting the fluid into the stream of plastics material, injection of the fluid commencing as soon as the stream of plastics material has passed the position at which the fluid is injected and the fluid creating a fluid containing cavity or core in the plastics material continuing to inject the pressurized fluid at a controlled rate whereby the fluid containing cavity or core extends with the plastics material as the plastics material continues to flow through the mould space, and after the supply of plastics material is terminated maintaining a pressure within the fluid containing cavity or core to hold the plastics material positively against the mould surfaces as the plastics material solidifies and cools until the moulding can itself sustain the form dictated by the mould surfaces.

28 Claims, 4 Drawing Sheets

FOREIGN PATENT DOCUMENTS

| | | |
|---|---|---|
| 57-14968 | 3/1982 | Japan . |
| 59-19017 | 1/1984 | Japan . |
| 61-53208 | 11/1986 | Japan . |
| 603072 | 6/1948 | United Kingdom . |
| 619286 | 3/1949 | United Kingdom . |
| 945234 | 12/1963 | United Kingdom . |
| 996186 | 6/1965 | United Kingdom . |
| 1076047 | 7/1967 | United Kingdom . |
| 1106567 | 3/1968 | United Kingdom . |
| 1167513 | 10/1969 | United Kingdom . |
| 1213869 | 11/1970 | United Kingdom . |
| 1318030 | 5/1973 | United Kingdom . |
| 2006668 | 5/1979 | United Kingdom . |
| 2139548A | 11/1984 | United Kingdom . |
| 2158002A | 11/1985 | United Kingdom . |

OTHER PUBLICATIONS

"Through-the-Nozzle Gas Injection Produces Class-A Foam Parts", Engineering & Processing News in *Modern Plastics*, Mar. 1980, pp. 22-24.

Dreger, Donald R., Staff Editor, "The Best of Two Worlds in Plastics Processing", in *Machine Design*, Dec. 9, 1982, pp. 99-102.

"New Automotive PP, HDPE Applications Tested in Europe", in *Plastics Technology*, Nov. 1985, p. 106.

"Process Molds Rigid, Smooth Parts that are Stress-Free", in *Modern Plastics*, Nov. 1985, p. 26.

"Advanced Injection Moulding Process", in *European Plastics News*, Jun. 1985.

"Plastics After Deal Clinched", by John Baker.

"Plastics Moulding Process Gives More Design Freedom", in *OEM Design*, Jun. 1985.

"Gas Injection Relieves Moulding Stresses", in *Eureka Transfers Technology*, Jun. 1985, p. 31.

"Moulding System with Body Appeal", I.C.I. Motor Ind., p. 5.

"Gas-Cored Injection Techniques go into Production", by Richard Wood, European Editor in *Plastics Machinery & Equipment*, Nov.-Dec. 1985.

CIN Press Brochure: "Controlled Internal Pressure Process", Presentation Summary, Tamworth, Staffs, England, 15 pages.

Peerless CIN Press, Ltd. (Presented: Plastics Show, Birmingham, England, Sep. 1985; Handed Out at SPE Meeting, Rochester, N.Y., Oct. 1985).

Cinpress Brochure: "Cost Saving with Cinpress", Tamworth, Staffs, England, Peerless Cinpress, Ltd. (Presented: Plastics Show, Birmingham, England, Sep. 1985; Handed Out at SPE Meeting, Rochester, N.Y., Oct. 1985), 14 pages.

Cinpress Brochure: "Cinpress-A New Plastics Process: Rigid, Smooth and Stress-Free Moudings", Tamworth, Staffs, England, Peerless/Foam Moulding Co., Ltd. (Members: Peerless PLC Group), 1982, 4 pages.

PROCESS AND APPARATUS FOR INJECTION MOULDING AND MOULDINGS PRODUCED THEREBY

REFERENCE TO A RELATED APPLICATION

This is a continuation-in-part application based on our copending application Ser. No. 607,560 filed May 7 1984 now abandoned.

BACKGROUND OF THE INVENTION

Field of the Invention

This invention relates to a process and apparatus for injection moulding and mouldings produced thereby. More particularly, the invention relates to the injection of a fluid under pressure into a stream of plastics material simultaneously to the introduction of the plastics material into a mould space. This fluid creates a pressurised mass of fluid or a gas containing core within the plastics material capable of applying an outward pressure on the plastics material urging it towards the mould surfaces.

SUMMARY

According to the invention there is provided a process of producing an injection moulding of plastics material comprising introducing the plastics material in the form of a molten stream into a mould space, measuring a quantity of a non-plastics fluid by filling a chamber with the fluid and holding the fluid in the chamber under pressure, said measured quantity being sufficient to achieve an intended weight reduction in the resultant injection moulding and to create a required internal pressure in the moulding to be formed, injecting at one or more selected positions fluid from the measured quantity of pressurised fluid into the stream of plastics material, injection of the fluid commencing as soon as the molten stream of plastics material has passed the position or positions at which the fluid is injected whereby the injection of fluid directly into the plastics material creates a fluid containing cavity or core in the plastics material, continuing to inject said pressurised fluid at a controlled rate whereby the fluid containing cavity or core extends with the plastics material as the plastics material continues to flow through the mould space, the enclosed fluid exerting a pressure on the surrounding plastics material to pressurise the plastics material outwardly towards the mould surfaces, terminating the supply of the stream of plastics material to the mould when the plastics material has extended over the whole of the mould space, and then maintaining a pressure within the fluid containing cavity or core to hold the plastics material positively against the mould surfaces as the plastics material solidifies and cools until the moulding can itself sustain the form dictated by the mould surfaces. The plastics material may include a blowing agent premixed therein.

It is preferred that the rate of introduction of the plastics material and the rate of injection of the fluid are controlled one relative to the other whereby the pressure of the fluid injected fluctuates with the pressure of the plastics material, whilst remaining higher than that pressure, to ensure a uniform injection of the fluid throughout the period of injection.

A high pressure may be applied to initiate the flow of the fluid into the plastics material to create the fluid containing cavity or core therein, the fluid pressure subsequently falling as the cavity extends with the plastics material through the mould space.

Some or all of the fluid may be injected into the plastics material at one or more selected positions within the mould space, or alternatively upstream of the mould space.

In one embodiment of the invention it is preferred that the fluid is a gas, preferably nitrogen or other inert gas. Alternatively, the fluid may be a liquid, but again it is preferable that the liquid is inert relative to the plastics material being moulded and not e.g. water which would require additional apparatus to control the effect of the steam produced on contact of the water with the hot plastics material. If desired the fluid may be a mixture of a liquid and a gas.

In this embodiment, during the flow of the fluid with the plastics material, the fluid preferably forms at least one mass within the plastics material which exerts said pressure on the plastics material towards the mould surfaces, and the process includes the step of relieving the pressure or allowing the pressure to dissipate itself to an acceptable level before the mould is opened. Also, in a case in which at any one selected position the fluid injected is a gas, the volume of the respective mass or fluid containing cavity may be formed by a portion only of the measured quantity of the gas, the remainder of the gas being injected into the cavity to increase the pressure therein, whereby a correspondingly increased outward pressure is applied to the plastics material, after the flow of the plastics material through the mould space has stopped. If desired more than one fluid containing cavity within the plastics material is formed by discontinuous injection of the fluid at the selected position or one of said positions, the pressure from each cavity being relieved separately. In either case, the pressure in the or each cavity may be relieved by causing fluid to leave the respective cavity.

In another embodiment the fluid is a liquid chemical blowing agent, and preferably a blowing agent which liberates nitrogen gas upon being heated to the decomposition temperature of the agent. Alternatively, the fluid may be a mixture of a gas and such a liquid blowing agent. In either case, the fluid is injected into the plastics material at a temperature which is below its decomposition temperature, the fluid being heated to its decomposition temperature by the plastics material whereby the fluid decomposes generating a gas which creates a porous core which exerts said pressure on the surrounding plastics material, any undesired excess pressure or residue of the fluid being removed or allowed to dissipate itself before the mould is opened. It is preferred but not necessarily essential that the blowing agent is preheated before it is injected into the plastics material.

The invention also provides an apparatus for producing an injection moulding of plastics material comprising means for introducing the plastics material in the form of a molten stream into a mould space, a chamber to be filled with a non-plastics fluid for measuring a quantity of the fluid, means for holding the measured quantity of fluid in the chamber under pressure, said measured quantity being sufficient to achieve an intended weight reduction in the resultant injection moulding and to create a required internal pressure in the moulding to be formed, at one or more selected positions means for injecting the pressurised fluid directly into the stream of plastics material, means for supplying the pressurised fluid form the chamber to the injection means, and for initiating said fluid supply as soon as the molten stream of plastics material has passed the position or positions at which the fluid is injected, means for controlling the rate of injection of the fluid into the plastics material whereby the fluid creates a fluid containing cavity or core in the plastics material which extends with the plastics material as the plastics material continues to flow through the mould space, the enclosed fluid exerting a pressure on the surrounding plastics material to pressurise the plastics material outwardly towards the mould surfaces, and means for maintaining a pressure within the fluid containing cavity or core, after the supply of plastics material to the mould has terminated when the plastics material has extended over the whole of the mould space, to hold the plastics material positively against the mould surfaces as the plastics material solidifies and cools until the moulding can itself sustain the form dictated by the mould surfaces.

Preferably for the or each selected position the fluid injection means is a piston and cylinder arrangement, the cylinder being connected by a passageway projecting into the path of the plastics material. The cylinder of the fluid injection means may be the measuring chamber for the fluid. Alternatively, for the or each selected position the fluid injection means may include a second piston and cylinder arrangement connected in series and upstream of the first-mentioned piston and cylinder arrangement, the cylinder of the second piston and cylinder arrangement comprising the measuring chamber for the fluid.

Preferably the effective volume of said measuring means is adjustable to allow the measured quantity of the fluid to be varied.

The invention further provides an injection moulding of plastics material formed by a process or apparatus as defined above.

DESCRIPTION OF THE PREFERRED EMBODIMENTS

Figure 1:
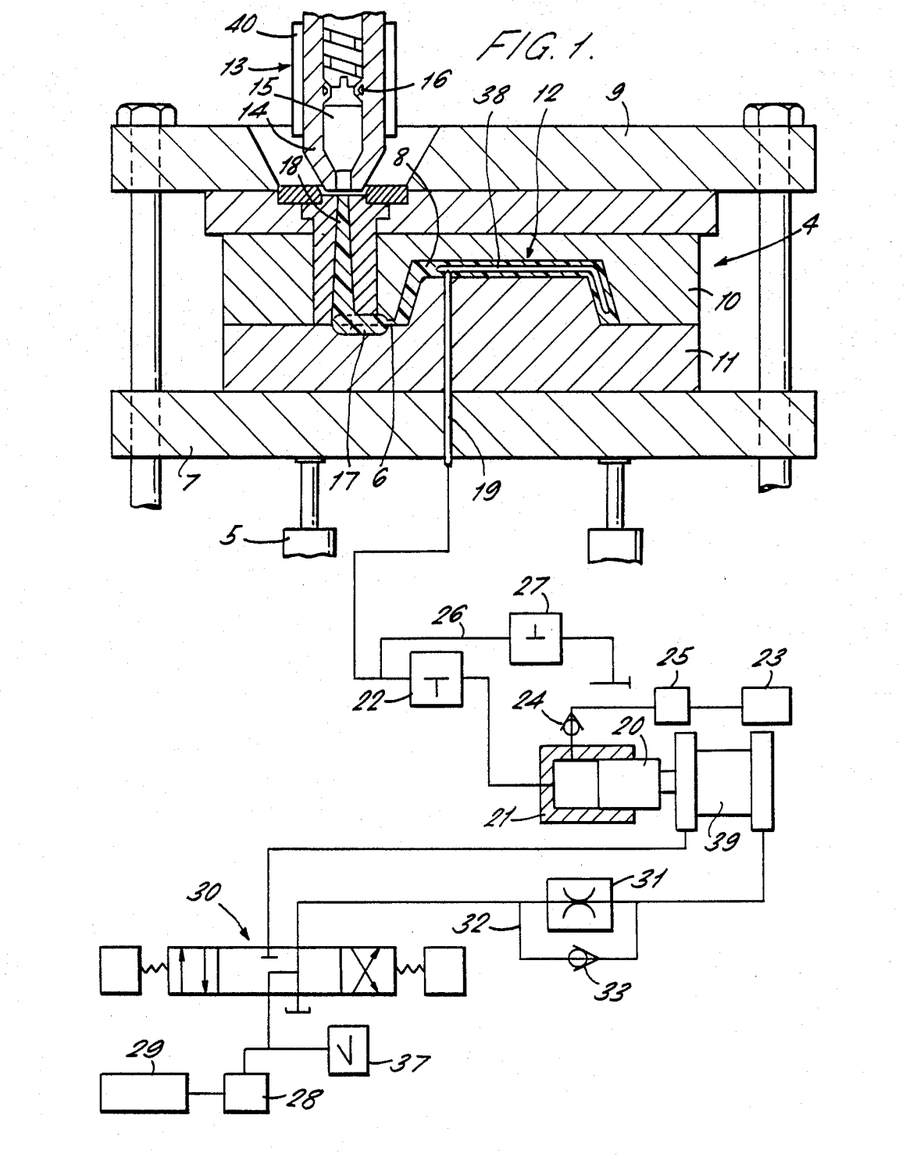
FIG. 1 is a layout of a mould and a screw ram of an injection moulding press.

Regarding FIG. 1, a mould 4 for use in an injection moulding press has upper and lower mould parts 10, 11 defining a mould space 12. The mould parts 10, 11 are mounted between a fixed platen 9 and a platen 7 movable by a hydraulic ram 5. Molten thermoplastics material 8 is introduced into the mould space 12 by a screw ram 13 having a nozzle 14, feed chamber 15, check ring 16, and heater 40 is known manner. The plastics material enters the mould space 12 from the nozzle 14 through a sprue 18, a runner 17 and a gate 6.

During the moulding process it is desired to create a pressure within the plastics material 8 to urge the surrounding plastics material outwardly into contact with the mould surfaces and thereby assist the external surface of the plastics material to take up the precise nature of the mould surfaces. The pressure also assists the mould space to be filled, especially in the case of narrow or extended positions which are normally difficult to fill. This pressure is applied by a fluid injected at at least one selected position, under pressure, into the plastics material as it flows between the moulding surfaces.

For this purpose a fluid injection passageway 19 extends, in this embodiment, through the lower mould paart 11 into the mould space and protrudes upwardly within the mould space to a point between, preferably substantially mid-way between, the upper and lower surfaces.

In this embodiment the fluid is a gas but it could be a liquid. The gas will be described as nitrogen which is the preferred gas since it is inert and reasonably cheap. To transmit the nitrogen to the passageway 19 there is provided a hydraulic ram 39 having a piston 20 and cylinder 21 connected to the passageway 19 via a solenoid operated valve 22, and to a nitrogen supply 23 via a non-return valve 24 (or a solenoid operated valve) and a pressure regulator 25. Downstream of the valve 22, the passageway 19 has a return connection 26 via another solenoid operated valve 27 either to waste or back to the nitrogen supply 23 so that at least some the nitrogen is recirculated. The cylinder 21 constitutes a chamber for measuring the predetermined, finite quantity of nitrogen it is desired to inject into the plastics material through the passageway 19 in any particular moulding cycle, both to create the required internal pressure and reduction in weight of the resultant product. The stroke of the piston 20 is adjustable so that the effective volume of the cylinder 21 and thereby the quantity of nitrogen to be injected may be varied. The control means of the ram 39 includes a hydraulic pump 28 operated by an electric motor 29 and protected by a pressure relief valve 37, a two-directional solenoid operated valve 30, and a flow control valve 31 having a bypass 32 including a non-return valve 33.

In operation the injection chamber 15 of the screw ram 13 is filled with sufficient molten plastics material to form the product to be moulded while still allowing for the cavity formed by the nitrogen as described below. The mould parts 10, 11 are closed and the moulding pressure applied by the platens 7 and 9 and the ram 5. The valve 22 is closed and the stroke of the piston 20 of the hydraulic ram 39 has been pre-set so that the piston is in its rear resting position. The cylinder 21 is then filled with a predetermined, measured quantity of nitrogen under pressure from the supply 23, thereby acting as a holding chamber for the measured quantity of nitrogen. This measured quantity is either the minimum amount which is required to reduce the weight of the moulding to the desired level or a predetermined greater amount for the reason explained below. The pressure of the nitrogen in the cylinder 23 is at the pressure set by the pressure regulator 25.

A pressure switch (not shown) is tripped indicating that the full clamping tonnage required is applied to the mould parts 10, 11. The plastics material in the injection chamber 15 is then introduced into the mould space 12 through the sprue 18, runner 17 and gate 6 by the screw ram 13. As soon as the plastics material 8 within the mould has passed and immersed the outlet end of the passageway 19, solenoid valve 22 is opened (valve 27 being closed), and the directional valve 30 operated to allow the ram 39 to inject the nitrogen in the cylinder 21 through the passageway 19 into the plastics material at a rate controlled by the flow control valve 31. By way of example, pressures which have been applied successfully in practice are 4000 lb/sq. in for polyethylenes, 5000 lb/sq. in for polystyrene, 6000 lb/sq. in for ABS, and 8000 to 9000 lb/sq. in for polycarbonates. By means of these pressures, the nitrogen is injected approximately into the middle of the thickness of the plastics material and forms a nitrogen filled cavity or mass 38 therein. A high pressure has to be applied initially in order that the nitrogen is capable of creating the nitrogen filled cavity. The pressure applied subsequently falls as the cavity or mass extends with the plastics material as the plastics material continues to flow through the mould space 12, the enclosed gas exerting a pressure on the surrounding plastics material to pressurise the plastics material outwardly towards the mould surfaces. The end of the stroke of piston 20 of the ram 39 may be timed to substantially coincide with the termination of the supply of the stream of plastics material to the mould, i.e. when the plastics material has extended over the whole of the mould space. The mould is then full and the screw ram 13 is effectively at the end of its stroke. Alternatively, by the time the screw ram stops turning, the piston 20 may have some forward movement remaining, which is completed after the end of the introduction of plastics material. The result is that nitrogen from the cylinder 21 continues to be injected into the nitrogen filled cavity or mass 38 formed within the plastics material after the mould space is full, whereby the pressure of the nitrogen in the mass 38 is increased and thereby the outward pressure applied on the plastics material urging it towards the mould surfaces, to improve the plastics surface definition.

Ram (13, 39) is maintained in its full pressure applying position until the moulded part and the sprue have solidified and cooled and their surface skin is self-supporting, i.e. the moulded part can itself sustain the form dictated by the mould surfaces. During the preceding cooling stage the plastics material tends to shrink which is well known. In conventional injection moulding, any attempt to prevent such shrinkage and consequential shrink marks involves the introduction of more plastics material. However, the more the plastics material cools, the harder it becomes to feed plastics material into the mould space. This problem is overcome by the present invention because the pressure continued to be applied by the ram 39 means that as the plastics material cools any tendency for the plastics material to shrink is resisted by the internal gas pressure and any spare capacity within the mould space is taken up by more gas being injected into the mould space, rather than by more plastics material. Such ability to resist the material shrinkage of the plastics material, at any position within the mould space, is possible throughout the cooling stage, and thereby provides a control over the moulding technique not known hitherto. Ram 13 may then be withdrawn. Also the directional valve 30 is reversed to allow the ram 39 to return to its rest position, the oil from the ram 39 returning to tank through the non-return valve 33 and the piston 20 being moved by the pressure of the nitrogen in the passageway 19. On completion of the return movement of the piston 20, valve 22 is closed. The pressure of the nitrogen trapped in the cylinder 21, and also the pressure of the gas still downstream of the valve 22, both in the passageway 19 and the mass 38, has thereby halved compared with the previous pressure, i.e. if the pressure was 400 p.s.i it is now 200 p.s.i. Valve 27 is then opened which relieves the remaining pressure of the nitrogen in the moulded part to the desired level which may be atmospheric pressure or above. The nitrogen emitted passes to atmosphere or at least some of it is returned to the supply for recirculation during a subsequent moulding cycle. The feed chamber 15 of the screw ram 13 and the cylinder 21 of the ram 39 may also be refilled with plastics material and nitrogen respectively in readiness for the next operating cycle. Finally the clamping pressure on the mould is relieved and the mould opened to remove the moulding.

The recirculation of some or all of the nitrogen extracted from the moulding during each operating cycle may be an advantage since the nitrogen returned will retain some of the heat from the previous cycle and thus result in the nitrogen injected during the next cycle having a temperature nearer that of the incoming plastics material than would otherwise be the case.

It will be appreciated that the embodiment described above allows an exact amount of nitrogen or other gas to be measured and injected into the plastics material. Also the pressure of the nitrogen injected is dictated by the injection pressure of the plastics material. In each moulding cycle the plastics injection pressure may vary. However, the pressure on the nitrogen injection ram 39 will change, i.e. hunt, in accordance with the drift in the plastics pressure (either up or down) automatically subject to the relief valve 37 being set to a pressure value which is greater than the maximum plastics pressure expected. This means that the nitrogen pressure is maintained high enough that it will enter the plastics material and yet not be unnecessarily high, or so high that it would burst the wall or skin of the surrounding plastics material. It is a further advantage that the pressure of the nitrogen in the mass 38 can be increased after the mass is full, thereby resisting the tendency of the plastics material to shrink which results in shrink marks in the surface of the moulding which are unacceptable or have to be removed by further processing.

In the above embodiment it is envisaged that the flow of nitrogen through the passageway 19 would be continuous so that a single nitrogen filled cavity or mass 38 is formed within the plastics material of the required size and at a desired position in the moulding both to exert the intended outward pressure on the plastics material and where a resultant cavity does not adversely affect the finished moulding. However, in another embodiment it may be desired to create two or more separate masses 38 of nitrogen in the moulding. This could be achieved either by arranging for the flow of nitrogen through the passageway 19 to be discontinuous or to provide more than one position in which a passageway 19 enters the moulding space. In the former case, it is preferable to provide dummy passageways 19 so that the pressure from each nitrogen filled cavity or mass 38 formed can be relieved before the mould is opened. Alternatively, it may be sufficient to allow the pressure of the nitrogen to dissipate itself either by return movement toward its entry point or by effecting movement of the adjacent internal mass of plastics material which is still flowable.

It will also be appreciated that the chosen position for the or each passageway 19 through which nitrogen or other gas is injected into the mould space 12 may be different from the position shown in FIG. 1. For example, the selected position may be adjacent the entry point of the plastics material. It may also be desirable that the angle at which the nitrogen is injected is substantially with the flow of plastics material between the mould surfaces rather than transverse to said flow. This could be achieved by the exit port of the passageway 19 being in the side wall of the end of the passageway which protrudes upwardly into the mould space.

Figure 2:
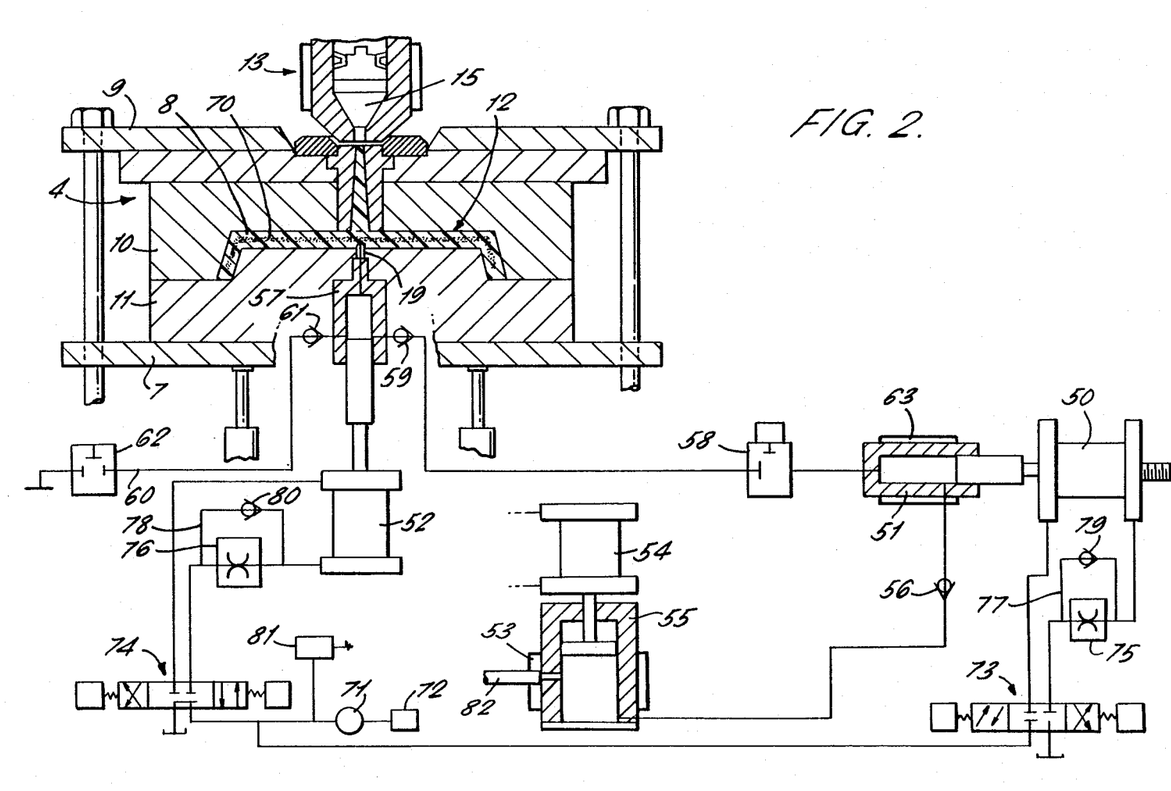
FIG. 2 is a layout of a mould and a screw ram of another injection moulding press.

FIG. 2 is concerned with a similar embodiment to the embodiment of FIG. 1, but employs a liquid blowing agent for injection into the plastics material 8 instead of nitrogen. The liquid blowing agent may be any suitable liquid which, on heating, releases a gas and for the purposes of the present invention may be any such blowing agent which is commercially available for use in cellular injection moulding. Preferably the agent is one which liberates nitrogen gas at its decomposition temperature. Thereby, as before, the fluid injected effects a weight reduction and an outward pressure on the plastics material urging it towards the mould surfaces. However, there is a different physical result in that the injected fluid does not form at least one mass within the plastics material which results in a cavity or cavities in the finished moulding, but rather decomposes generating a gas which created a gas containing core 70 within the plastics material in similar fashion to conventional structural foam mouldings. But the present embodiment can provide an important advantage over conventional structural foam mouldings, since if the basic plastics material does not contain a blowing agent, the absence of blowing agent in the outer wall or skin of plastics material during the moulding cycle combined with the effect achieved by pressurising the plastics material against the mould surfaces, means that post-moulding treatment of the external surface of the moulding need not be required.

An example of a preferred chemical blowing agent suitable for the purposes of the invention are those marketed under the name GENITRON EP of FBC Limited, U.K. These substances are all modified azodicarbonamides which are specifically designed for use in injection moulding and extrusion processes. When decomposed in use, these blowing agents liberate about 60% nitrogen and carbon monoxide, 30% carbon dioxide and 10% ammonia. They decompose within a temperature range of 120°–290° C. depending upon the particular one that is chosen to be compatible with the melt temperature processing range of most thermoplastic polymers. These temperature ranges can also be extended and at higher temperatures an ammonia-free system is generally advantageous. These blowing agents are normally in the form of a powder having an average particle diameter up to 10 microns and, in order to be used in accordance with the present invention, they are furnished as liquid dispersions containing 30–40% blowing agent dispersed in a compatible liquid for ease of handling. These blowing agents must be kept away from strong alkalis with which they will react. Ammonia-free systems should be stored away from acids. The liquid is compatible and inert with respect to the polymers used for the moulding; e.g. styrene, ABS, polycarbonates, and the like. When incorporated into the plastics material, the liquid blowing agent dispersion together with the plastics material is then heated above the decomposition temperature of the chemical blowing agent to generate the nitrogen gas required in the moulding process. Hence, the chemical blowing agent selected must decompose to evolve gas within the melt processing range of the polymer to be expanded permitting solution of the evolved gas in the polymer melt. The function of the liquid carrier is to act as a complimentary nucleation system, in addition to the solid phase nucleating present in the blowing agent itself. The ability of the chemical blowing agent to be able to perform as expected is therefore dependent on the melt temperature and pressure during the moulding process. These liquid blowing agent compositions are well known in the art and any suitable one of them that is compatible with the polymer system may be used.

The mould and screw ram of the moulding press remains substantially unchanged except that in this embodiment the chosen position for introducing the plastics material into the mould space 12 is above the centre of the mould space 12. The position of the injection of the blowing agent, i.e. the passageway 19, is directly beneath the entry point for the plastics material. In this embodiment the method of injection involves a dual hydraulic ram arrangement which rams are operated in series, the first ram 50 having a cylinder 51, which is the measuring chamber for determining the finite quantity of blowing agent to be injected during a particular moulding cycle, and the second ram 52 effecting the injection. The reason for this dual arrangement is that the blowing agent is preheated both whilst it is in the measuring chamber 51 by heater 63 and also by the heater 53 of a further pneumatic ram 54 which has a large capacity cylinder 55 acting as a storage cylinder for the blowing agent fed into the cylinder through conduit 82. The cylinder 55 of the pneumatic ram is connected by a non-return valve 56 to the cylinder 51 of the first hydraulic ram, which is in turn connected to the cylinder 57 of the second hydraulic ram 52 via a solenoid operated valve 58 and a non-return valve 59. The cylinder 57 also has a connection 60 to waste including a non-return valve 61 and a solenoid operated valve 62.

Both hydraulic rams 50, 52 are operated by a common hydraulic pump 71 and electric motor 72, the pump being protected by a relief valve 81, but the rams have their respective two-directional solenoid operated valves 73, 74 and flow control valves 75, 76 each with its bypass 77, 78 including a non-return valve 79, 80.

The operating cycle of this embodiment will now be described. To start with the storage cylinder 55 is filled with liquid blowing agent which is heated by the heater 53. The pneumatic ram is then operated to fill the measuring chamber which is the cylinder 51 of the first hydraulic ram 50. As before the volume of the cylinder may be varied by adjusting the stoke of the ram 50. The measured amount of blowing agent is heated again by heater 63.

The mould is closed and the clamping pressure applied. The feed chamber 15 of the screw ram 13 is full of plastics material. The directional valve 73 of the first hydraulic ram 50 is then energised and solenoid valve 58 opened to allow the ram 50 to transfer the blowing agent from the measuring chamber to the injection chamber which is the cylinder 57 of the second hydraulic ram.

The plastics material is introduced into the mould space 12. When the end of the passageway 19 upstanding in the mould space is immersed in the plastics material the directional valve 74 is energised to cause the second hydraulic ram 52 to inject the blowing agent upwardly into the centre of the plastics material. The contact between the blowing agent and the plastics material further heats the blowing agent to its decomposition temperature. The decomposition of the blowing agent results in the generation of nitrogen gas, the effect of which is to create a gas containing core 70 which extends into the plastics material as the plastics material continues to flow through the mould space until the mould space is filled. The effect of the blowing agent is limited by the flow control valve 76 on the operation of the ram 52 and thereby on the rate of injection of the blowing agent. This is important to ensure that the core does not extend to the surface of the plastics material whereby the outer wall or skin is punctured. On the other hand the internal pressure created by the enclosed nitrogen causes an outward pressure on the surrounding solid plastics material which pressurises it against the mould surfaces. When the introduction of plastics material and the injection of the measured, finite quantity of blowing agent is complete, the pressure applied by the ram 52 is maintained, and the pressure within the core is maintained to hold the plastics material positively against the mould surfaces as the plastics material solidifies and cools until the moulding can itself sustain the form dictated by the mould surfaces. The directional valve 74 is then energised to cause the hydraulic ram 52 to withdraw its piston. The solenoid valve 62 is also opened to allow any excess pressure or residue of the blowing agent in the moulding, the passageway 19 and the cylinder 57 to be vented to atmosphere. Normally, sufficient dissipation of this pressure is achieved because the cells of the core are generally interconnected back to the point of entry of the blowing agent. However, it is not necessarily essential that the pressure should reduce itself to atmospheric pressure since some degree of internal pressure can be supported by the walls of the moulding. Indeed, in some cases, some of the cells may not be directly interconnected with the entry point but as in the first described embodiment the pressure within those cells can reduce itself to a safe level by effecting movement of the adjacent plastics material which is still flowable. The clamping pressure may then be relieved so that the mould can be opened and the moulding removed.

It will be appreciated that during the above described injection step of the blowing agent, the solenoid valve 58 is closed to allow the measuring chamber to be recharged with the blowing agent from the storage cylinder 55 ready for the next moulding cycle.

Figure 3:
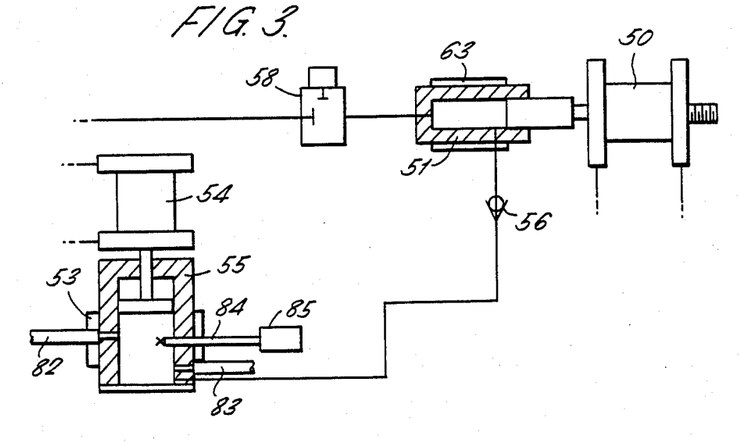
FIGS. 3 and 4 show alternative modifications of the injection moulding press of FIG. 2.
Figure 4:
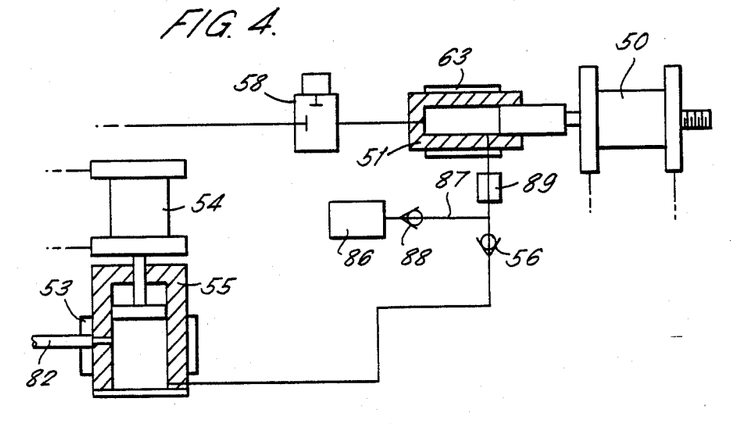

If desired the fluid introduced into the plastics material may comprise a mixture of a gas and a liquid blowing agent instead of a gas or a liquid blowing agent only. In this case, FIG. 3 shows the storage cylinder 55 of FIG. 2 having a gas entry conduit 83 beneath the liquid blowing agent entry conduit 82 and a mixer 84 operated by an electric motor 85. The gas is preferably argon, nitrogen, or freon. The cylinder 55 is filled with both liquid blowing agent and gas which are formed into a homogeneous mixture by the mixer 84 and simultaneously heated by the heater 53. Alternatively, as shown in FIG. 4, the storage cylinder 55 may remain unchanged from the embodiment of FIG. 2, and the gas introduced into the blowing agent from a supply 86 through a passageway 87 at a position between the non-return valve 56 and the cylinder 51. The passageway 87 has a non-return valve 88 and in this embodiment the gas and liquid blowing agent are mixed by an alternating direction mixer 89 which homogenises the two constituents to produce a mixture which is passed into the cylinder 51. In each case the operating cycle from thereon is the same as that described with reference to FIG. 2.

The gas/liquid mixture may be 1:1 or varied as required to give the desired internal cell structure of the resultant moulding. For example, to produce a more cellular structure, the amount of liquid is increased relative to the amount of gas and vice versa if more open cavities or channels are required. It will thus be appreciated that this gas/liquid variation may be employed to achieve the combination of (a) being able to increase the internal gas pressure after the introduction of plastics material is complete which is an advantage of the gas only embodiment of FIG. 1, and (b) a cellular structure (although not as fine a structure as with liquid blowing agent only) which is desirable to reinforce the outer wall or skin of the moulding.

Figure 5:
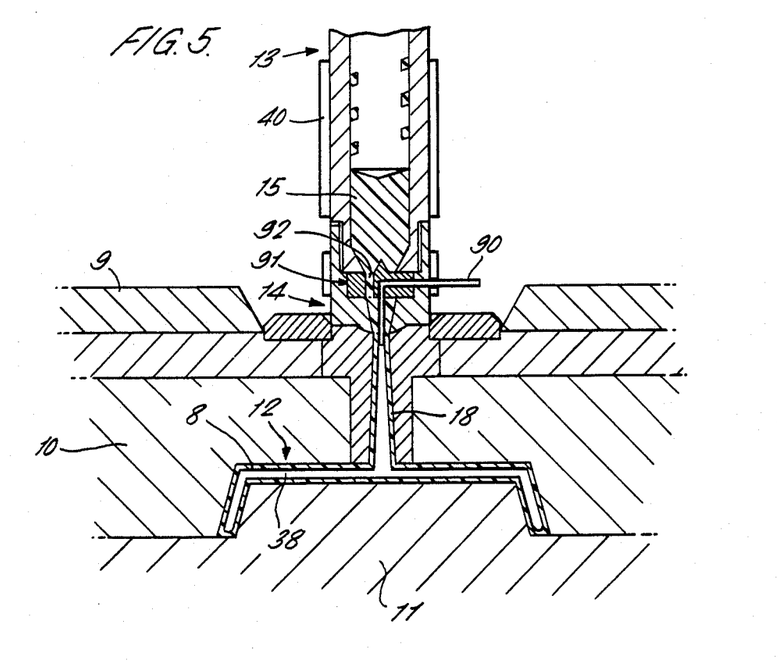
FIG. 5 shows a different arrangement in which the fluid is injected at a position upstream of the mould space.
Figure 6:
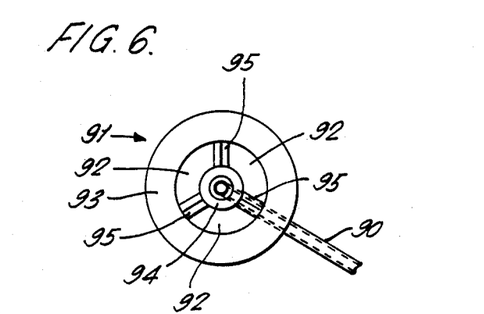
FIG. 6 is an end view of part of the nozzle and the fluid injection passageway of the arrangement of FIG. 3.

FIGS. 5 and 6 relate to a modified embodiment which as shown is applied to the production of a moulding having an internal cavity 38 or cavities, as described with reference to FIG. 1, but which is also applicable to the embodiment of FIGS. 2 to 4 in which the moulding has a gas containing core or cores resulting from the injection of a blowing agent. The modification concerns the fact that instead of fluid being injected into the stream of plastics material at one or more selected positions within the mould space 12, the fluid is injected upstream of the mould space. The fluid may be injected at any convenient position or positions between the feed chamber 15 of the screw ram 13 and the gate 6 forming the entrance to the mould space 12. In this modified embodiment, the fluid is injected by the ram 39 (or in another embodiment the ram 52) via a passageway 90 having its outlet end at a position which is substantially at the upper end of the sprue 18 formed during the moulding cycle. For this purpose, the screw 13 has a different nozzle 14 having an end fitting incorporating a spider insert 91 comprising an outer wall 93 joined to a hub 94 by three webs 95, thereby forming three segment-shaped apertures 92 through which the plastics material may flow. The fluid injection passageway 90 passes radially through the outer wall 93 and one of the webs 95 into the hub 94 of the insert. The passageway is then directed axially in the direction of flow of the plastics material to the desired position at which the fluid is to be injected into the plastics material.

In operation, when the flow of plastics material has immersed the outlet end of the passageway 90, the measured quantity of fluid is allowed to pass into the plastics material and flow therewith into the mould space 12 thereby forming the pressurised mass 38 (or porous core 70) which urges the plastics material 8 towards the mould surfaces. Also, as in each other embodiment, the pressure applied is maintained to hold the plastics material positively against the mould surfaces as the plastics material solidifies and cools until the moulding can itself sustain the form dictated by the mould surfaces.

The invention is not restricted to the specific details of the embodiments described above. For example, the basic plastics material may contain a blowing agent mixed therewith within the screw ram.

Also, the fluid injected into the plastics material may be a liquid which is inert relative to the plastics material. The effect of the liquid is the same as the gas in the embodiment of FIG. 1, i.e. it creates a pressurised mass within the plastics material which when evacuated at the end of the moulding process leaves a cavity within the moulding. Also, in the same manner as when the gas is used, the internal pressure provided by the liquid within the pressurised mass is maintained and controlled throughout the cooling stage to resist the tendency of the plastics materials to shrink at any position within the mould space.

However, in the case of each embodiment described above it will be appreciated that an injection moulding may be produced which employs less plastics material and is lighter than if the moulding is solid. The creation of the internal pressure also results in a moulding having an external surface which corresponds closely to the internal surface of the mould and which, unlike conventional structural foam mouldings, may be acceptable without post-moulding treatment such as painting. On the other hand, such treatment may still be carried out, if desired. For example, the moulding may be painted to obtain a particular decorative colour instead of just to hide blemishes in the external surface. Furthermore, mouldings may be produced in a shorter time than is usual in the case of structural foam mouldings.

One particular type of moulding for which the process is particularly applicable is a moulding having a generally large surface area supported by thicker areas defined by, for example, ribs leading perhaps to bosses and/or a rim of the moulding, i.e. the ribs and bosses and/or rim being thicker than the adjacent parts of the moulding. During the production of the moulding, the fluid injected into the plastics material extends with the plastics material along each rib thereby urging the plastics material to each side and against the mould surfaces. Moreover, the internal pressure applied by the fluid on the plastics material is transmitted to, for example, a boss at the far end of the rib, without substantial pressure loss.

We claim:

1. A process of producing an injection moulded plastic article, comprising the steps of:
    determining a quantity of non-plastic fluid sufficient to achieve an intended weight reduction in the article being produced as well as required internal pressure in the article being produced;
    increasing the volume of a variable volume chamber to hold the determined quantity of non-plastic fluid;
    measuring said quantity of the non-plastic fluid by filling said variable volume chamber with the non-plastic fluid at a pressure determined in relation to the increased chamber volume;
    introducing plastic material in the form of a stream into a mould space;
    pressurizing the non-plastic fluid to a pressure sufficient to initiate the creation of at least one cavity of non-plastic fluid in the stream of plastic material when the non-plastic fluid is introduced into contact with the plastic material;
    reducing the volume of said variable volume chamber at a controlled rate to introduce the non-plastic fluid into the stream of plastic material so as to initiate the formation of the cavity of non-plastic fluid within the stream of plastic material;
    continuing to control the rate of reduction of the variable volume chamber to pressurize the non-plastic fluid after the cavity is initiated, maintaining a non-interrupted flow of the non-plastic fluid at a pressure higher than that of the stream of plastic material yet not so high as to cause a rupture in the plastic material defining the cavity formed therein, terminating the introduction of plastic material;
    continuing to apply pressure to the plastic material through the pressurized non-plastic fluid until the plastic material has spread completely throughout said mould space and the plastic material is positively held against the surface of said mould space; and continuing to apply a pressure to the plastic material through the pressurized non-plastic fluid within the cavity while the plastic material solidifies and cools until the article can itself sustain the form dictated by the interior surface of the mould.

2. A process as claimed in claim 1, further including, subsequent to initiating of said cavity, continuing to introduce plastic material into said stream simultaneously to maintaining a pressure within said cavity, by reducing the volume of said chamber.

3. A process as claimed in claim 1, further comprising continuing to reduce the volume of the variable volume chamber and thereby continuing to pressurize the non-plastic fluid to cause the non-plastic fluid to flow into said cavity at a pressure sufficient to force the plastic material to extend throughout the mould space.

4. A process as claimed in claim 1, wherein the fluid is a gas.

5. A process as claimed in claim 4, wherein the gas is nitrogen.

6. A process as claimed in claim 1, wherein the fluid is a liquid.

7. A process as claimed in claim 6, wherein the liquid fluid is a chemical blowing agent dispersed in a liquid.

8. A process as claimed in claim 7, wherein said agent liberates nitrogen gas upon being heated to the decomposition temperature of said agent.

9. A process as claimed in claim 1, wherein venting of said cavity occurs after said solidification and cooling of said plastic material and before the mould is opened.

10. A process as claimed in claim 9, wherein the non-plastic fluid introduced is a gas and wherein the volume of the respective gas filled cavity is formed by a portion only of the measured quantity of the gas, the remainder of the gas being introduced into the cavity to increase the pressure therein.

11. A process as claimed in claim 9, wherein non-plastic fluid pressure is relieved by causing the non-plastic fluid to leave the respective cavity after the article form has become self-sustaining.

12. A process as claimed in claim 9, wherein the non-plastic fluid introduced is a gas, and wherein at least some of the gas released during the step of relieving the pressure in the or each gas filled cavity is retained for recirculation during a subsequent moulding cycle.

13. A process as claimed in claim 1, wherein the non-plastic fluid is a liquid blowing agent or a mixture of a gas and a liquid blowing agent which is introduced into the stream of plastic material at a temperature which is below its decomposition temperature, the non-plastic fluid being heated to its decomposition temperature by the plastic material whereby the non-plastic fluid generates a gas which creates a closed cell cellular foam core with said gas exerting said pressure on the surrounding plastic material.

14. A process as claimed in claim 13, wherein the non-plastic fluid is preheated before it is introduced into the plastic material.

15. A process as claimed in claim 1, wherein the introduction of the non-plastic fluid is controlled so that the pressure of the non-plastic fluid introduced remains higher than the pressure of the plastic material to ensure a uniform introduction of the non-plastic fluid throughout the period of its introduction.

16. A process as claimed in claim 1, wherein at least some of the non-plastic fluid is introduced into the stream of plastic material at at least one selected position within the mould space.

17. A process as claimed in claim 1, wherein at least some of the non-plastic fluid is introduced into the stream of plastic material at at least one selected position upstream of the mould space.

18. A process as claimed in claim 1, wherein said step of increasing the volume of the variable volume chamber includes setting the volume of said chamber such that the measured quantity is emptied from the chamber during the time said step of pressurizing with non-plastic fluid to hold the plastic material positively against the surface of said mould space is carried out.

19. A process as claimed in claim 1, wherein said step of increasing the volume of the variable volume chamber includes setting the volume of said chamber such that a portion of the non-plastic fluid remains within said chamber during the time said step of pressurizing with non-plastic fluid to hold the platic material positively against the surface of said mould space is carried out, and further introducing into the cavity a quantity of said portion of the non-plastic fluid to further increase the pressure in said cavity, whereby since the plastic material is already being exerted against the interior of said mould space the chance of rupturing is reduced and the increase in pressure further improves the definition of the exterior surface of the resultant article and further resists any tendency for the solidifying plastic material to contract away from the interior surface of said mould.

20. An injection molded article produced by the process of claim 1.

21. An apparatus for producing an injection moulded plastic article, comprising:
a mould having a mould space formed therein;
a variable volume chamber;
means connecting said variable volume chamber to said mould;
means for increasing the volume of said variable volume chamber to receive a predetermined quantity of non-plastic fluid;
filling means for filling said variable volume chamber with the predetermined quantity of non-plastic fluid;
plastic introducing means for introducing plastic material in the form of a stream into the mould space;
reducing means to reduce the volume of the variable volume chamber to pressurize the non-plastic fluid to a pressure sufficient to initiate the creation of at least one cavity of non-plastic fluid within the stream of plastic when the non-plastic fluid is placed in contact with the stream of plastic and said reducing means adapted to introduce the pressurized non-plastic fluid from said variable volume chamber into the mould space to form at least one cavity of non-plastic fluid in said plastic material;
controlling means for said reducing means for ensuring that the pressure of the non-plastic fluid in the cavity does not rupture the plastic material defining the cavity being formed in the mould space;
said reducing means adapted to apply pressure to the plastic material through the pressurized non-plastic fluid at a pressure sufficient to force the plastic material completely throughout the mould space and said reducing means adapted to continually pressurize the non-plastic fluid at a pressure sufficient to force the plastic material positively against the interior surface of the mould;
said reducing means adapted to continue to apply pressurization to the non-plastic fluid such that the plastic material is further forced against the interior surface of the mould space during cooling of the plastic material so as to improve the definition of the resultant article exterior surface and resist any tendency of the solidifying plastic material to shrink away from the mould surface.

22. An apparatus as claimed in claim 21, wherein said controlling means includes flow control means for establishing a rate of introduction of the non-plastic fluid into said cavity which rate distributes the plastic material throughout said mould space and prevents the cavity, once formed, from becoming too highly pressurized so as to rupture the plastic material.

23. Apparatus as claimed in claim 21, wherein the non-plastic fluid introducing means is a piston and cylinder arrangement, the cylinder being connected by a passageway projecting into the stream of the plastic material.

24. Apparatus as claimed in claim 23, wherein the cylinder of the fluid introducing means comprises the measuring chamber for the non-plastic fluid.

25. Apparatus as claimed in claim 23, wherein the non-plastic fluid introducing means includes a second piston and cylinder arrangement connected in series and upstream of the first-mentioned piston and cylinder arrangement, the cylinder of the second piston and cylinder arrangement comprising the measuring chamber for the non-plastic fluid.

26. Apparatus as claimed in claim 21, wherein the effective volume of the measuring chamber is adjustable to allow the measured quantity of the non-plastic fluid to be varied.

27. Apparatus claimed in claim 21, wherein a selected position for introducing the non-plastic fluid is at a position upstream of the mould space.

28. Apparatus as claimed in claim 21, wherein the measuring chamber has means associated therewith for heating the non-plastic fluid therein.

* * * * *

UNITED STATES PATENT AND TRADEMARK OFFICE
CERTIFICATE OF CORRECTION

PATENT NO. : 4,824,732

DATED : April 25, 1989

INVENTOR(S) : HENDRY et al.

It is certified that error appears in the above-identified patent and that said Letters Patent is hereby corrected as shown below:

On the title page;

On line 5 in the left-hand column of the cover sheet delete "Geoffery D. Cahan" and replace with --Geoffery D. Gahan--;

In line 15 of the "ABSTRACT" insert --,-- between "material" and "continuing";

In the right-hand column of page 2, lines 13 and 16, delete "CIN Press" and replace with --Cinpres--;

line 19, delete "Cinpress" and replace with --Cinpres-- (both occurrences);

line 20, delete "Cinpress" and replace with --Cinpres--;

line 24, delete "Cinpress" and replace with --Cinpres-- (both occurrences).

In column 4, line 10, delete "paart" and replace with --part--;

UNITED STATES PATENT AND TRADEMARK OFFICE
CERTIFICATE OF CORRECTION

PATENT NO. : 4,824,732

DATED : April 25, 1989

INVENTOR(S) : HENDRY et al.

It is certified that error appears in the above-identified patent and that said Letters Patent is hereby corrected as shown below:

line 25, insert --of-- between "some" and "the".

In column 8, line 43, insert --,-- between "with" and "the";

line 47, insert --,-- between "before" and "the".

Claim 1, line 5, insert --a-- between "as" and "required".

Claim 19, line 6, delete "platic" and replace with --plastic--.

Signed and Sealed this

Nineteenth Day of June, 1990

Attest:

HARRY F. MANBECK, JR.

*Attesting Officer*     *Commissioner of Patents and Trademarks*

(12) EX PARTE REEXAMINATION CERTIFICATE (5027th)
United States Patent
Hendry et al.

(10) Number: US 4,824,732 C1
(45) Certificate Issued: Nov. 30, 2004

(54) PROCESS AND APPARATUS FOR INJECTION MOULDING AND MOULDINGS PRODUCED THEREBY

(75) Inventors: James W. Hendry, Spring Hill, FL (US); Geoffrey D. Gahan, Little Kingshill (GB)

(73) Assignee: Cinpres Limited

Reexamination Request:
No. 90/006,771, Sep. 2, 2003

Reexamination Certificate for:
Patent No.: 4,824,732
Issued: Apr. 25, 1989
Appl. No.: 06/857,015
Filed: Apr. 29, 1986

Certificate of Correction issued Jun. 19, 1990.

Related U.S. Application Data

(63) Continuation-in-part of application No. 06/607,560, filed on May 7, 1984, now abandoned.

(30) Foreign Application Priority Data

May 11, 1983  (GB) .............................................. 8312933

(51) Int. Cl.$^7$ .......................... B32B 3/26; B29C 67/20; B29C 49/00; B29C 44/02; C08J 9/34
(52) U.S. Cl. ............................... 428/542.8; 264/37.33; 264/45.5; 264/50; 264/54; 264/328.12; 264/500; 264/572; 264/DIG. 83; 425/4 R; 425/522; 425/546; 425/817 R; 521/51

(56) References Cited

U.S. PATENT DOCUMENTS 4,101,617 A     7/1978   Friederich
4,106,887 A  *  8/1978   Yasuike et al. ............. 425/549
4,247,515 A     1/1981   Olabisi

OTHER PUBLICATIONS

Declaration of Steven A. Jordan, Jan. 9, 1997.

Witness Statement of Steven Andrew Jordan, Sep. 18, 1998.

\* cited by examiner

Primary Examiner—Jill L Heitbrink (57) ABSTRACT

The invention provides a process and apparatus for producing an injection moulding of plastics material. The process comprises introducing the plastics material in the form of a molten stream into a mould space, measuring a quantity of a non-plastics fluid by filling a chamber with the fluid and holding the fluid in the chamber under pressure, said measured quantity being sufficient to achieve an intended weight reduction in the resultant injection moulding and to create a required internal pressure in the moulding to be formed, injecting the fluid into the stream of plastics material, injection of the fluid commencing as soon as the stream of plastics material has passed the position at which the fluid is injected and the fluid creating a fluid containing cavity or core in the plastics material continuing to inject the pressurized fluid at a controlled rate whereby the fluid containing cavity or core extends with the plastics material as the plastics material continues to flow through the mould space, and after the supply of plastics material is terminated maintaining a pressure within the fluid containing cavity or core to hold the plastics material positively against the mould surfaces as the plastics material solidifies and cools until the moulding can itself sustain the form dictated by the mould surfaces.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–28 is confirmed.

* * * * *